June 22, 1965
E. A. PETERSON ETAL
3,190,678
CASINGS FOR BOOKS
Filed Nov. 9, 1962
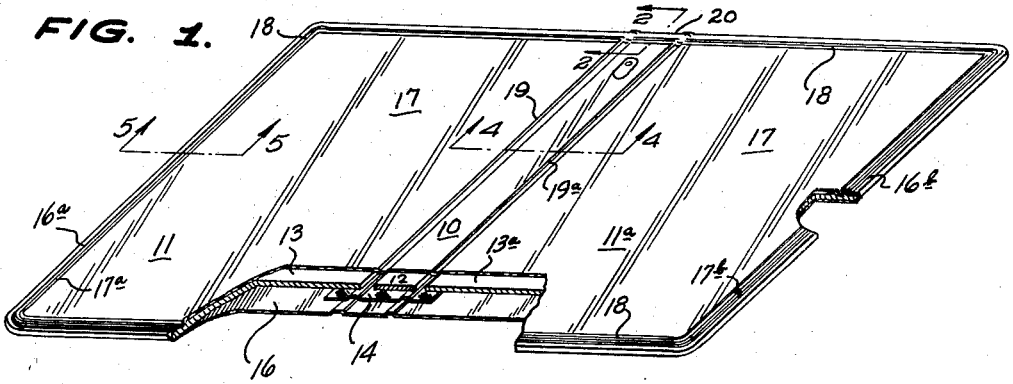
FIG. 1.
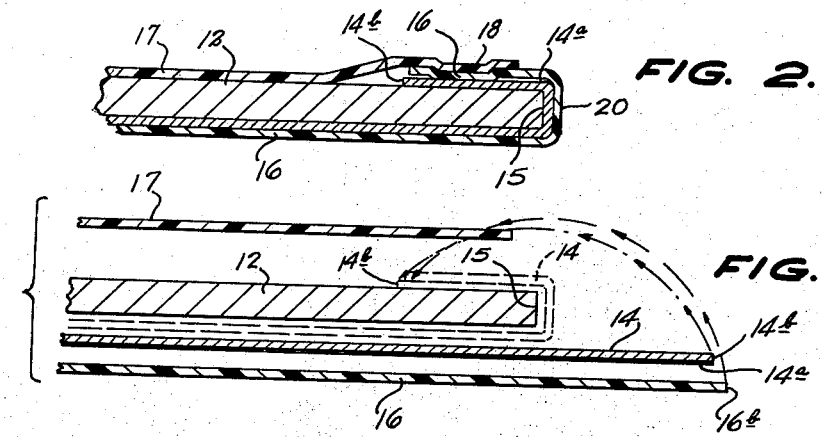
FIG. 2.
FIG. 3.
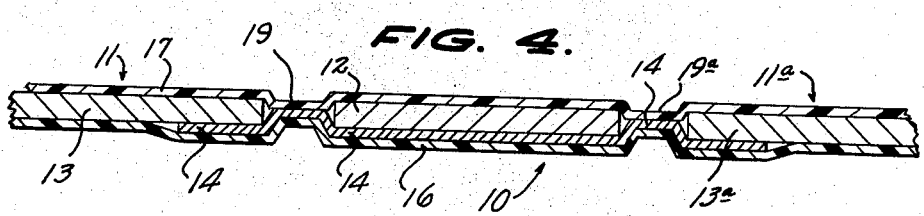
FIG. 4.
FIG. 5.
FIG. 6.
INVENTORS
EVERETT A. PETERSON,
HAROLD W. PETERSON,
BY
ATTORNEY.

United States Patent Office 3,190,678
Patented June 22, 1965

3,190,678
CASINGS FOR BOOKS
Everett A. Peterson, Roslyn Heights, and Harold W. Peterson, Roslyn, N.Y., assignors to Peterson Electronic Die Co., Inc., Mineola, N.Y., a corporation of New Jersey
Filed Nov. 9, 1962, Ser. No. 236,594
3 Claims. (Cl. 281—29)

This invention relates to casings or bindings for books and relates more particularly to the reinforcement of the hinge joint between the side covers and backbone of the casing or binding where thermoplastic materials such as polyvinyl chloride, for example, are used for the covering material. In prior art constructions where thermoplastic materials were used to cover casings, it was and is the practice to weld the cover materials to each other in the space between the backbone and the side cover boards to form the hinge joint. It was found that with handling and constant flexing, there was a tendency for the material to tear at this point, thus destroying the hinge connection between the side cover and backbone.

It is an object of the present invention to remedy this condition by strengthening the hinge connection between the side covers and the backbone of a book without substantially or visibly increasing the bulk of the hinge connection or the book. A further object of the invention is to accomplish this result, economically and efficiently and in a manner which lends itself readily to the manufacturing process where thermoplastic materials are used as cover materials. To this end the invention comprises the insertion of a strip of material between the backbone of the book and the outer covering material, said strip overlapping the hinge portions of the book on each side of the backbone, and with a reentrant portion overlying a marginal edge of the filler board adjacent the backbone. This strip is preferably an open mesh fabric coated on one or both sides with a thermoplastic material of a nature similar to that used for the covering material of the book. Assuming use of a strip with one coated face, the strip is placed with the fabric face directly adjacent the backbone, the coated face thus lying in contact with the outer thermoplastic covering material. When the covering material is welded together, the hinge joint is formed between the backbone and side filler boards by welding the inner and outer covering materials together, with the backbone reinforcing strip between them. The outer thermoplastic cover material becomes welded to the thermoplastic coating of the strip and the inner thermoplastic cover becomes welded to the same coating through the interstices of the threads of the open mesh fabric, thus providing a reinforced joint without any additional welding glueing, or other labor operation.

For a more complete understanding of the invention, reference is made to the accompanying drawings and specification wherein one practical embodiment is delineated and described for illustrative purposes.

FIGURE 1 is an inside plan view of a casing or binder according to this invention, with a portion shown in section.

FIGURE 2 is a cross-section taken along the line 2—2 of FIGURE 1.

FIGURE 3 is an enlarged, exploded view of FIGURE 2 showing the parts in their relative positions before the reinforcing strip and cover material are folded over the filler board.

FIGURE 4 is an enlarged, sectional view taken along the line 4—4 of FIGURE 1.

FIGURE 5 is an enlarged, sectional view taken along the line 5—5 of FIGURE 1.

FIGURE 6 is an enlarged, sectional detail of the open mesh reinforcing material showing the thermoplastic coating on one face thereof.

The type of book cover selected for illustrating the invention is that type known as a three-ring binder for supporting loose leaf sheets, although the invention may equally well be applied to other types of casings for books. This type of cover comprises a backbone 10 having adjacent side boards 11, 11a, hinged thereto by means of the covering material used, as will be more fully described.

The backbone comprises a stiffening member 12, usually of a stiff cardboard or chipboard, and the adjacent sides include stiff side boards 13, 13a of similar material. In forming the cover, the backbone is placed between the side boards and slightly spaced therefrom as shown. The reinforcing strip 14, of greater length and width than the backbone, of open mesh fabric, coated on its outer side 14a with a thermoplastic material, is placed over the backbone 12, with portions overlapping the hinge joint on each side thereof, and further overlapping the adjacent marginal end edge 15 of each side board. The ends 14b, 14c (only one of which is shown) are turned in and folded down over the inner face of the backbone. The thermoplastic cover materials for the inner and outer sides of the book are placed over the side filler boards 13, 13a and over the backbone of the book, the outer cover material 16 having slightly greater length and width so that its marginal edges 16a, 16b may be folded over the inner face of the side covers. The inner thermoplastic cover material 17, of slightly less length and width than the overall length and width of the side boards and backbone, is placed over the inner face thereof, with its marginal edges 17a, 17b overlying the infolded edges 16a, 16b, respectively.

The thermoplastic cover materials are welded to each other as indicated along the line 18 on the inner face of the book or casing, along the inner, marginal faces thereof, and along the lines 19, 19a defining the hinge connection between the side covers and backbone. During the welding period, the outer, coated face 14a of the reinforcing strip becomes welded to the outer cover material 16 along the lines 19, 19a, and the inner cover material 17 becomes welded to the coating 14a through the interstices of the fabric, along the same lines 19, 19a. The ends 14b, 14c of the reinforcing strip become welded to the outer cover material 16 along the line 18, the coated face of the strip adhering to the outer cover 16, the inner cover 17 at the same time being welded to the outer cover 16. Thus each hinge joint 19, 19a is reinforced by the strip 14 not only along its entire length, but along the outer edges 20 as well, where the strip is turned over the backbone and side boards to form a double thickness of reinforcing material at what are usually the weakest points.

By thus assembling the casing, the filler boards and backbone are not adhesively secured to the cover materials or to the reinforcing strip. This leaves a slight space or pocket between the filler boards, backbone and cover sheets within which air is trapped, so that the cover material is free to give slightly with respect to the side filler boards and backbone under the pressure of the fingers, giving the binding the soft, smooth feel or "hand" as it is called in the trade, of a much more expensive binding material such as leather.

The thermoplastic materials used for the cover sheets and the coating for the reinforcing strip may include such synthetic resins as cellulose acetate, polyvinyl acetate and polyvinyl chloride.

Changes in the construction, materials, arrangement and design may be made without departing from the spirit of the invention as defined by the appended claims.

We claim:
1. A casing for books comprising a backbone, a side filler board on each side of said backbone, the adjacent edges of said backbone and filler boards being spaced from each other, a cover sheet for said boards on the inner and outer faces thereof, said cover sheets spanning said spaces and forming a hinge connection between said backbone and filler boards, a reinforcing strip for said hinge connection, said strip being of greater length and width than said backbone and extending laterally and longitudinally outwardly with respect to said backbone, said lateral portions extending across said hinge connections and overlapping the adjacent portions of said filler boards, the longitudinally extending portions of said strip being folded over the upper and lower edges of said backbone onto the inner face of said backbone and filler boards and upon itself at the hinge connection, said lateral and folded-over portions being secured only to each other and to the cover sheets at the hinge portions, and only to said cover sheets over said filler boards and backbone.

2. A casing according to claim 1 in which the strip is a thermoplastic coated open mesh fabric, and in which the cover sheets are of thermoplastic materials.

3. A casing for books comprising a backbone, a side filler board on each side of said backbone, the adjacent edges of said backbone and filler boards being spaced from each other, a cover of thermoplastic materials for said boards on the inner and outer faces thereof, said cover sheets spanning said spaces and forming a hinge connection between said backbone and side boards, a reinforcing strip for said hinge connection, said strip comprising an open mesh fabric having a thermoplastic lining on one face thereof, said strip being of greater length and width than said backbone and extending laterally and longitudinally with respect to said backbone, said lateral portions extending across the said hinge connections and overlapping the adjacent portions of said filler boards, the longitudinally extending portions of said strip being folded, respectively, over the upper and lower edges of said backbone onto the inner face of said backbone and filler boards, and upon itself at the hinge connection, said lateral and folded-over portions being secured only to each other and to the cover sheets at the hinge portions, and only to said cover sheets over said backbone and filler boards, said cover sheets being movable with respect to said backbone and side boards under pressure of the fingers.

References Cited by the Examiner
UNITED STATES PATENTS

| | | | |
|---|---|---|---|
| 2,182,801 | 12/39 | Frazier | 281—21 |
| 2,339,586 | 1/44 | Roberts | 281—29 |
| 2,390,125 | 12/45 | Schade | 281—29 |
| 2,434,502 | 6/48 | Martin et al. | 281—29 |
| 2,486,339 | 10/49 | Schade | 281—29 |
| 2,564,085 | 8/51 | Taylor | 281—21 |

FOREIGN PATENTS

| | | |
|---|---|---|
| 1,041,118 | 5/53 | France. |
| 796,063 | 6/58 | Great Britain. |
| 487,051 | 11/53 | Italy. |

JEROME SCHNALL, *Primary Examiner.*

LAWRENCE CHARLES, *Examiner.*